US010718383B2

(12) United States Patent
Spector

(10) Patent No.: US 10,718,383 B2
(45) Date of Patent: Jul. 21, 2020

(54) TRACTOR PTO QUICK-CONNECT DEVICE AND METHOD OF USE

(71) Applicant: PTO Solutions, LLC, Stafford, TX (US)

(72) Inventor: Kenneth Spector, Katy, TX (US)

(73) Assignee: PTO Solutions, LLC, Stafford, TX (US)

( * ) Notice: Subject to any disclaimer, the term of this patent is extended or adjusted under 35 U.S.C. 154(b) by 48 days.

(21) Appl. No.: 15/910,439

(22) Filed: Mar. 2, 2018

(65) Prior Publication Data

US 2018/0252270 A1 Sep. 6, 2018

Related U.S. Application Data

(63) Continuation-in-part of application No. 15/783,887, filed on Oct. 13, 2017, now abandoned, and a continuation-in-part of application No. PCT/US2018/018603, filed on Feb. 19, 2018.

(Continued)

(51) Int. Cl.
*F16D 1/112* (2006.01)
(52) U.S. Cl.
CPC .................. *F16D 1/112* (2013.01)
(58) Field of Classification Search
CPC ...... A01B 61/02; A01B 61/025; B60K 17/28; F16B 2200/50; F16B 2200/503;
(Continued)

(56) References Cited

U.S. PATENT DOCUMENTS 2,460,137 A 1/1949 Lindeman 2,738,210 A 3/1956 Hjembo
(Continued)

FOREIGN PATENT DOCUMENTS

DE 2260914 A1 * 6/1974 .............. F16D 1/112

OTHER PUBLICATIONS

Lee W. Young, PCT International Search Report, dated May 29, 2018, 3 pages, ISA/US Commissioner for Patents, Alexandria, Virginia, United States.

(Continued)

*Primary Examiner* — Josh Skroupa
(74) *Attorney, Agent, or Firm* — Oathout Law Firm; Mark A. Oathout; Laura Tu

(57) ABSTRACT

A quick-release device for a tractor PTO shaft includes a first plate with a first body with a first outer surface and a second outer surface and a first thickness disposed therebetween; a plurality of openings extending through the first thickness of the first body; and at least one locking hole extending through the first thickness of the first body. The device also includes a second plate with a second body having a third outer surface and a fourth outer surface and a second thickness disposed therebetween; a plurality of connectors extending from the third outer surface of the second body, the plurality of connectors are configured to removably engage with the plurality of openings. The device further including a locking pin configured to secure the first plate and the second plate via the at least one locking hole; a housing secured to the first plate and configured to engage with the tractor PTO shaft; and an implement spline extending from the fourth outer surface of the second plate, the implement spline is configured to removably engage with an implement.

16 Claims, 9 Drawing Sheets

Related U.S. Application Data

(60) Provisional application No. 62/466,359, filed on Mar. 2, 2017.

(58) Field of Classification Search
CPC .......... F16B 2200/506; F16B 2200/509; F16D 1/033; F16D 1/076; F16D 1/10; F16D 1/108; F16D 1/112; F16D 2001/103; Y10S 464/901; Y10T 403/16; Y10T 403/1616; Y10T 403/1624; Y10T 403/64; Y10T 403/642; Y10T 403/645; Y10T 403/648
USPC ...... 403/11, 13, 14, 335–338; 464/137, 182, 464/901
See application file for complete search history.

(56) References Cited

U.S. PATENT DOCUMENTS

| | | | | |
|---|---|---|---|---|
| 2,803,474 | A * | 8/1957 | Wilson | F16D 1/108 403/336 |
| 2,924,121 | A * | 2/1960 | Wilson | F16D 1/076 254/340 |
| 3,384,937 | A | 5/1968 | Muncke et al. | |
| 3,427,826 | A | 2/1969 | Anderson | |
| 3,662,567 | A | 5/1972 | Condon et al. | |
| 4,407,598 | A * | 10/1983 | Hendershot | F16D 1/033 403/337 |
| 4,541,817 | A * | 9/1985 | Sawabe | F16D 1/076 403/337 |
| 4,553,652 | A | 11/1985 | Fallos | |
| 5,501,010 | A * | 3/1996 | Scott | F16D 1/076 29/525.04 |
| 7,166,031 | B2 * | 1/2007 | Schott | F16D 1/12 464/137 |
| 7,261,637 | B2 * | 8/2007 | Tokuoka | F16D 3/48 464/138 |
| 7,284,625 | B2 | 10/2007 | Jones | |
| 7,329,065 | B2 * | 2/2008 | Hu | F16D 1/033 403/349 |
| 7,462,105 | B2 * | 12/2008 | Lattin | F16D 3/70 464/137 |
| 9,698,650 | B2 * | 7/2017 | Filzen | H02K 7/116 |
| 10,156,260 | B1 * | 12/2018 | Livengood | F16D 1/10 |
| 10,253,821 | B2 * | 4/2019 | Knuth | B60K 17/28 |
| 2005/0202882 | A1 | 9/2005 | Schott et al. | |
| 2009/0194302 | A1 | 8/2009 | Vergara | |
| 2011/0290570 | A1 | 12/2011 | Goulet et al. | |
| 2013/0230352 | A1 | 9/2013 | Goulet et al. | |
| 2016/0238081 | A1 | 8/2016 | Knuth | |
| 2017/0082154 | A1 * | 3/2017 | Reel, Jr. | F16D 1/076 |

OTHER PUBLICATIONS

Lee W. Young, PCT Written Opinion of the International Searching Authority, dated May 29, 2018, 6 pages, ISA/US Commissioner for Patents, Alexandria, Virginia, United States.

Lee W. Young, PCT International Search Report for PCT/US2018/018603, dated Jun. 20, 2018, 3 pages, ISA/US, United States of America.

Lee W. Young, PCT Written Opinion of International Searching Authority for PCT/US2018/018603, dated Jun. 20, 2018, 3 pages, ISA/US, United States of America.

* cited by examiner

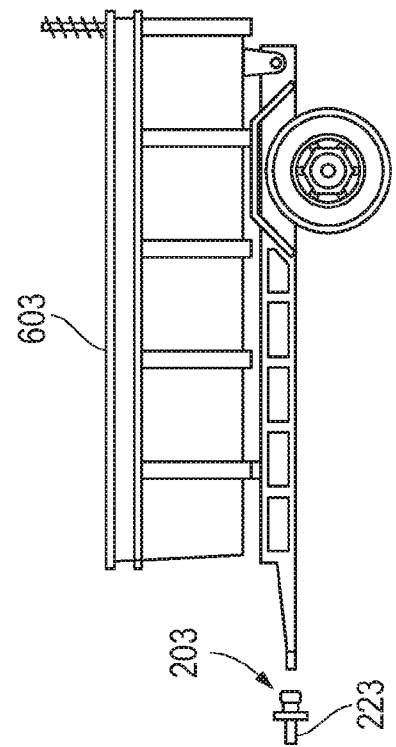
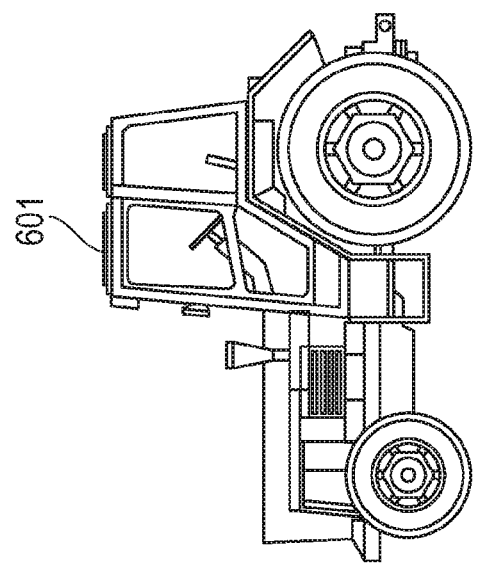
FIG. 7

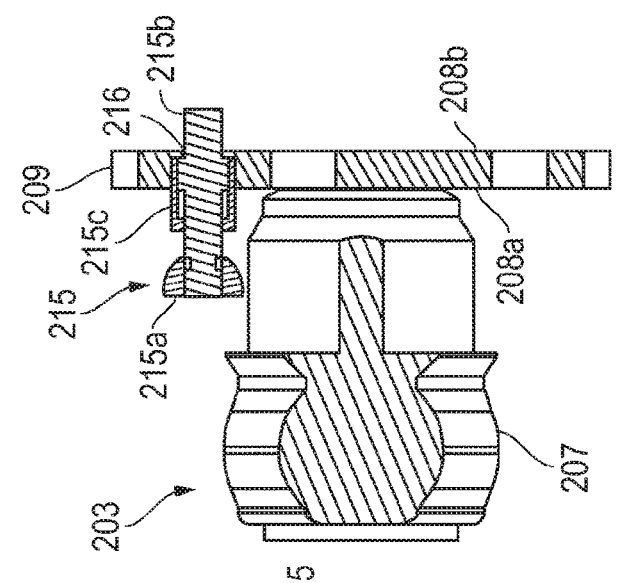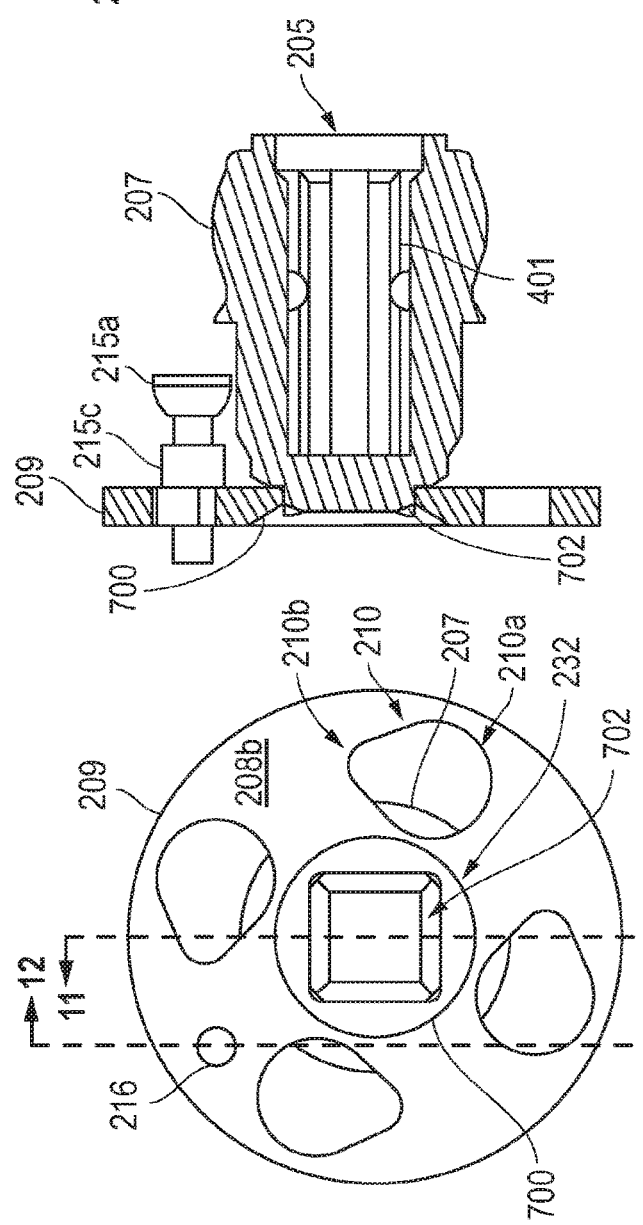

TRACTOR PTO QUICK-CONNECT DEVICE AND METHOD OF USE

BACKGROUND

1. Field of the Invention

The present invention relates generally to tractors components, and more specifically, to a PTO tractor quick-release device for removably securing a tractor implement to the tractor PTO shaft.

2. Description of Related Art

The power take off shaft, otherwise known as the "PTO" shaft is well known in the art and is an effective means for a tractor to transfer power from the engine to the rotary implement. Such rotary implements could include brush hogs, tillers, spreaders, and the like. In FIG. 1, an oblique view of a conventional PTO device 101 having to components 103, 105 rotatably secured to each other, wherein one of the components removably secures to the PTO shaft and the other component secures to the rotary implement. During use, the device 101 is removably secured to the PTO shaft of the tractor.

One of the problems commonly associated with PTO device 101 is the limited use and difficulty with securing to the PTO shaft. For example, the use is required to find and adjust the device to secure to the splines of the PTO shaft. The process can become time consuming and difficult in confined areas of the PTO shaft location. It should be understood that the process of removing and attaching multiple implements during a project is frustrating and increases the overall duration of the project. Accordingly, there is a need for a rapid and effective system configured to easily secure the implements to the PTO shaft.

Although great strides have been made in the area of PTO devices, many shortcomings remain.

BRIEF SUMMARY

A quick-release device for a tractor PTO shaft includes a first plate with a first body with a first outer surface and a second outer surface and a first thickness disposed therebetween; a plurality of openings extending through the first thickness of the first body; and at least one locking hole extending through the first thickness of the first body. The device also includes a second plate with a second body having a third outer surface and a fourth outer surface and a second thickness disposed therebetween; a plurality of connectors extending from the third outer surface of the second body, the plurality of connectors are configured to removably engage with the plurality of openings. The device further including a locking pin configured to secure the first plate and the second plate via the at least one locking hole; a housing secured to the first plate and configured to engage with the tractor PTO shaft; and an implement spline extending from the fourth outer surface of the second plate, the implement spline is configured to removably engage with an implement.

The terms "power take off" may also be referred to as "PTO".

DESCRIPTION OF THE DRAWINGS

The exemplary embodiments may be better understood, and numerous objects, features, and advantages made apparent to those skilled in the art by referencing the accompanying drawings. These drawings are used to illustrate only exemplary embodiments, and are not to be considered limiting of its scope, for the disclosure may admit to other equally effective exemplary embodiments. The figures are not necessarily to scale and certain features and certain views of the figures may be shown exaggerated in scale or in schematic in the interest of clarity and conciseness.

FIG. 7 is a side view of an alternative exemplary embodiment of the disclosed system;

FIG. 10 is an end view of the alternative exemplary embodiment of FIG. 8.

FIG. 11 is a cross-sectional view of the alternative exemplary embodiment along line 11-11 as shown in FIG. 10.

FIG. 12 is a cross-sectional view of the alternative exemplary embodiment along line 12-12 as shown in FIG. 10.

Figure 1:
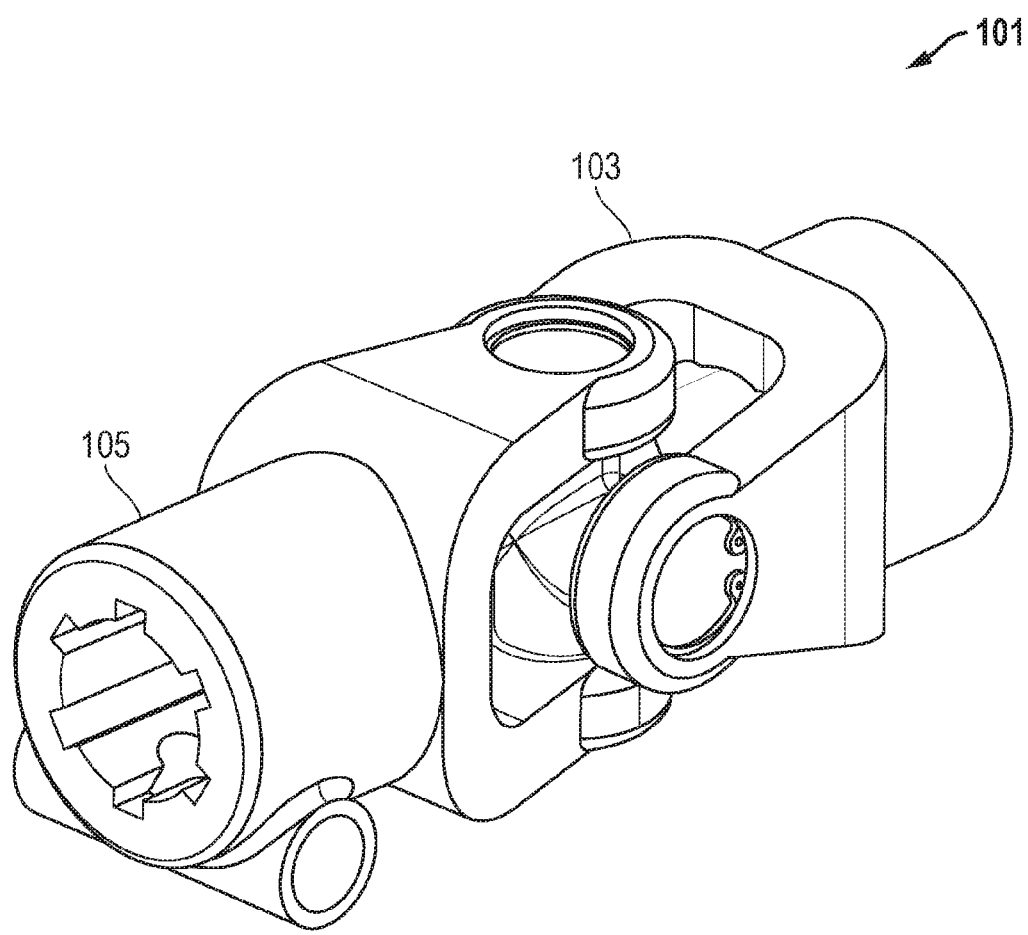
FIG. 1 is an oblique view of a conventional PTO device.

While the system and method of use of the present application is susceptible to various modifications and alternative forms, specific exemplary embodiments thereof have been shown by way of example in the drawings and are herein described in detail. It should be understood, however, that the description herein of specific exemplary embodiments is not intended to limit the invention to the particular exemplary embodiment disclosed, but on the contrary, the intention is to cover all modifications, equivalents, and alternatives falling within the spirit and scope of the present application as defined by the appended claims.

DETAILED DESCRIPTION OF THE EXEMPLARY EMBODIMENTS

Illustrative exemplary embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional systems and methods to secured implements to a PTO shaft. Specifically, the present invention is directed to a system and method configured to rapidly and easily secure the implement to a PTO shaft via two opposing plates configured to removably engage with each other via connectors and corresponding openings. These and other unique features of the system and method of use are discussed below and illustrated in the accompanying drawings.

The system and method of use will be understood, both as to its structure and operation, from the accompanying drawings, taken in conjunction with the accompanying description. Several exemplary embodiments of the system are presented herein. It should be understood that various components, parts, and features of the different exemplary embodiments may be combined together and/or interchanged with one another, all of which are within the scope of the present application, even though not all variations and particular exemplary embodiments are shown in the drawings. It should also be understood that the mixing and matching of features, elements, and/or functions between various exemplary embodiments is expressly contemplated herein so that one of ordinary skill in the art would appreciate from this disclosure that the features, elements, and/or functions of one exemplary embodiment may be incorporated into another exemplary embodiment as appropriate, unless described otherwise.

Referring now to the drawings wherein like reference characters identify corresponding or similar elements throughout the several views, FIGS. 2-9 depict various views of a system 201 and method of use in accordance with exemplary embodiments of the present application. It will be appreciated that system 201 overcomes one or more of the above-listed problems commonly associated with the conventional systems and methods to removably secure the PTO implement to the PTO shaft of a tractor.

It should be understood that although the system 201 is discussed with respect for use with a tractor 601, it is also contemplated utilizing the features discussed herein with other vehicles and/or engines having a PTO shaft 602 configured to engage with PTO implements 603 having implement shafts or receptacles 604.

Figure 2:
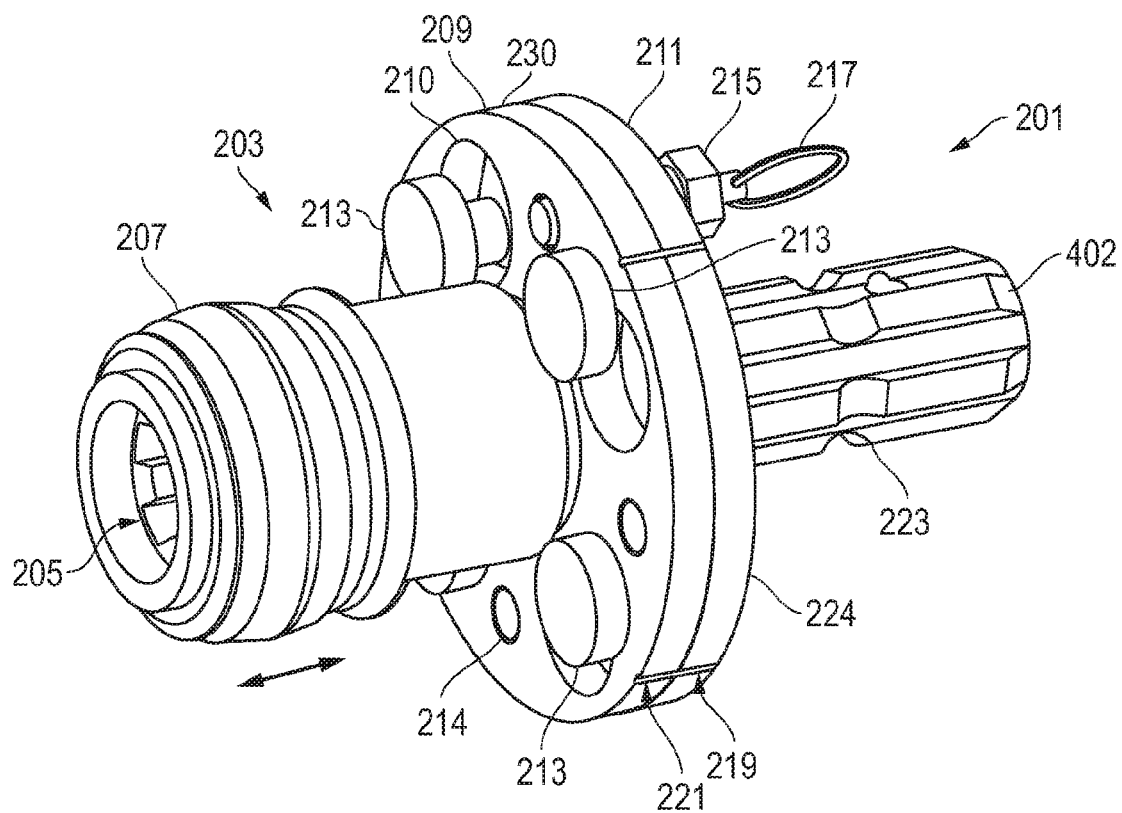
FIG. 2 is an oblique view of a system and method of use in accordance with the present embodiment of the present invention.
Figure 3:
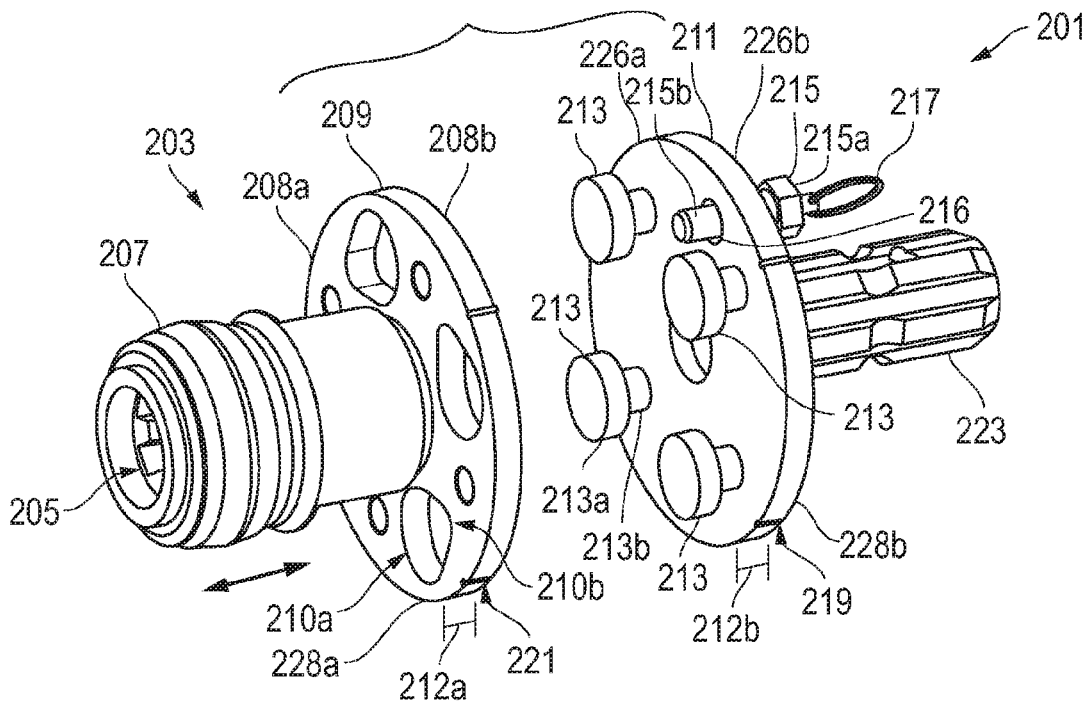
FIG. 3 is an exploded view of the system of FIG. 2.

In an exemplary embodiment, PTO link device or system 201 (also referred to as a tractor and implement link device or system, or quick-release PTO shaft system or device 201) includes one or more of a first plate 209 having a first or cylindrical body 230 and one or more of a substantially similar second plate 211 having a second body 224, wherein the second plate 211 is configured to removably engage with the first plate 209 in a releasably locked position as shown in FIG. 2 and an unlocked position, as shown in FIG. 3. To achieve this feature, it is contemplated that plate 209 includes a plurality of teardrop, oblong, asymmetrical, or tapered openings or slots or clevis openings 210 extending through the thickness 212a of the first plate 209 and configured to lockingly engage with a plurality of connectors, bolts, pins, magnets, studs or extensions 213, e.g., clevis pins 213 extending from an outer surface 226a of a second body 224 of the second plate 211 (also referred to as the first surface 226a of the second body 224 or the second plate 211, and also referred to as a third outer surface 226a), wherein the plurality of connectors 213 are configured to removably engage with the plurality of openings 210. The plurality of connectors 213 may have a connector top 213a attached to a connector shaft 213b, wherein the connector top 213a is of a larger size or diameter than the connector shaft 213b. The plurality of openings 210 may each define a larger open end 210a and a smaller open end 210b, wherein the connector top 213a may be insertable and removable from the larger open end 210a, but wherein the connector top 213a is incapable of or prohibited from insertion or removal from the smaller open end 210b because the connector top 213a is of a larger size or diameter than the smaller open end 210b. However, the smaller open end 210b is configured to accommodate the diameter of the connector shaft 213b and for movement of the connector shaft 213b between the smaller open end 210b and the larger open end 210a. The first body 230 of the first plate 209 has a first outer surface 208a and a second outer surface 208b and a first thickness 212a disposed therebetween. The second body 224 of second plate 211 may have a thickness of 212b. The second body 224 of the second plate 211 may include an outer surface 226a (also referred to herein as the third outer surface 226a) and an outer surface 226b or second outer surface 226b of the second body 224 or second plate 211 (also referred to herein as the fourth outer surface 226b), wherein the second thickness 212b is disposed therebetween. The distance from top 213a to the third outer surface 226a of second plate 211 (or roughly the exposed length of shaft 213b) is greater than the thickness 212a of first plate 209 (i.e. they cannot interfere but tolerance may be close), or the thickness 212a at the openings/slots 210 could be modified by chamfer, bevel or the like.

The first plate 209 may also optionally be referred to herein as a receiver adaptor, receiver plate, female adaptor, female plate or female adaptor plate 209. Additionally, the second plate 211 may be optionally referred to herein as a spline plate, male adaptor, male plate or male adaptor plate 211.

As shown in FIG. 2, the connectors 213 are configured to extend through the plurality of openings 210 of plate 209, through the larger open end 210a, and are locked in position when the connectors 213 are rotated to a position within the smaller open end 210b, such that one or more grooves, guides or guidelines 219 and 221 (wherein the groove 221 is defined, inscribed or painted on the circumference 228a around the first plate 209 and the groove 219 is defined, inscribed, or painted on the circumference 228b around the second plate 211) come into contact or are alignment with each other. There may be multiple grooves or guidelines 221 on the first plate 209, and there may be a corresponding number of grooves or guidelines 219 on the second plate 211. A locking pin or locking shear pin 215, wherein the locking shear pin 215 has a locking pin head or locking shear pin head 215a and a locking pin stem or locking shear pin stem 215b, is preferably secured to plate 211 (or optionally threaded or inserted through a locking shear pin opening or slot 216 which may be defined on the second plate 211) and configured to secure or engage with one or more locking holes, locking pin holes or locking shear pin holes 214 disposed between each opening 210. The at least one locking hole 214 may extend through the first thickness 212a of the first body 207. In certain exemplary embodiments, there may be, by way of example, four (4) locking holes 214. In other exemplary embodiments, there may only be one locking hole 214. Furthermore, certain exemplary embodiments may include one or more locking pin openings or slots, or locking shear pin openings or slots 216. By way of example only, there may be four (4) locking pin openings or slots 216 in an alternative exemplary embodiment. The number of locking holes 214 and/or locking pin openings or slots 216 are not limited to a certain amount or number within this disclosure. The diameter of the locking shear pin head 215a may be of a larger diameter or size than the diameter of the one or more locking holes 214 and also larger (in diameter and/or size) than the diameter of the locking shear pin opening or slot 216, while the diameter of the locking shear pin elongated stem 215b is smaller in size and/or diameter than the diameter of the locking holes 214 and locking shear pin opening or slot 216, such that the elongated stem 215b may be inserted within, threaded within, or engageable with the locking hole 214 and locking shear pin opening or slot 216. The locking shear pin 215 may include a ring 217 located on the locking shear pin head 215a that allows the user or operator to pull there against, which in turn disengages, unthreads or removes the elongated stem or shaft 215b of the locking shear pin from the locking hole 214. In alternative exemplary embodiments, the locking shear pin 215 may or may not be threaded and may be a safety shear pin, a clamp, a pin having a lever, or a spring loaded pull pin (see e.g. FIG. 11-12 depicting the locking shear pin 215 with a spring loaded housing 215c having a spring and housing around the stem 215b).

During use, the two plates 209 and 211 are configured to rotate or twist together or relative to each other and secured to each other via one or more connectors 213 and one or more openings 210. The locking shear pin 215, after insertion into the locking shear pin opening 216 and into at least one of the locking holes 214, is configured to prevent or prohibit rotation of the two plates 209 and 211 relative to each other.

Figure 8:
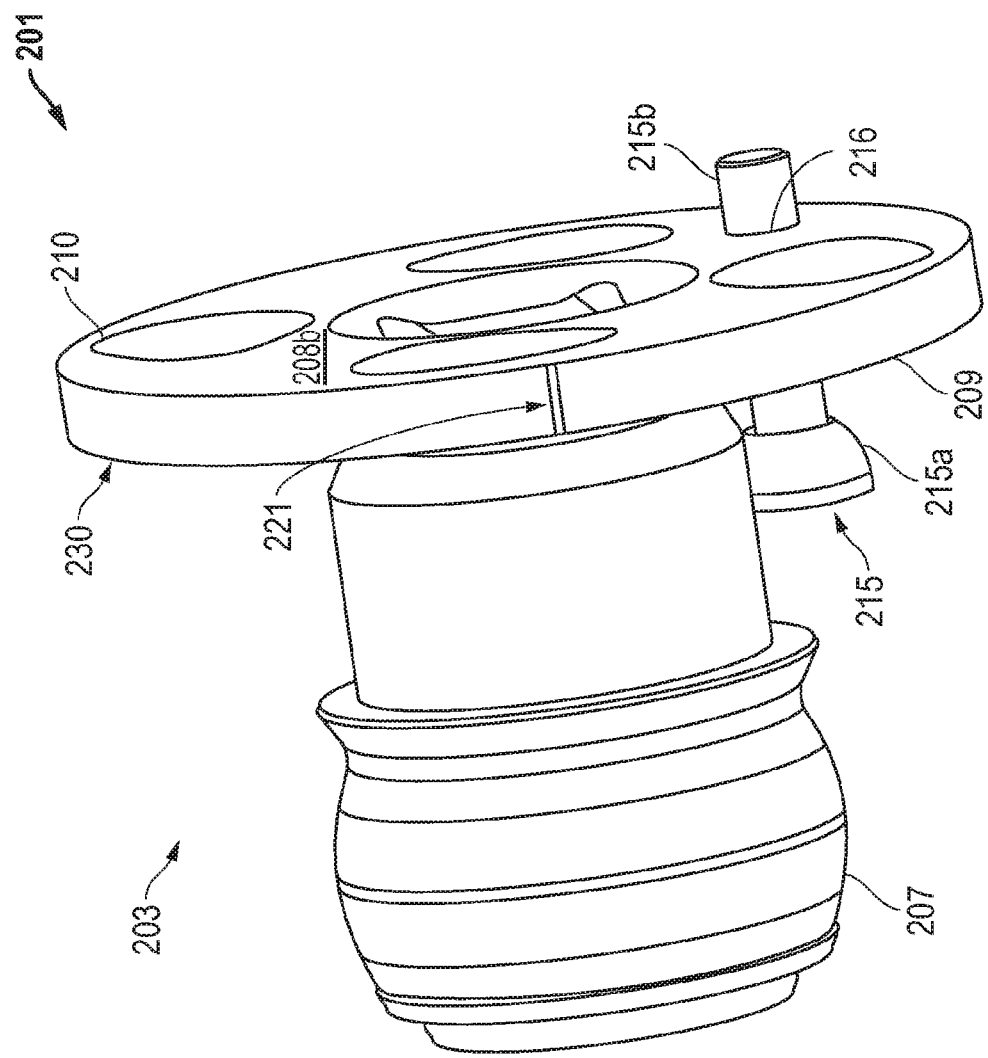
FIG. 8 is an oblique view of an alternative exemplary embodiment of an improved PTO system's first plate, wherein the first plate has a female spline housing which attaches to the tractor.
Figure 9:
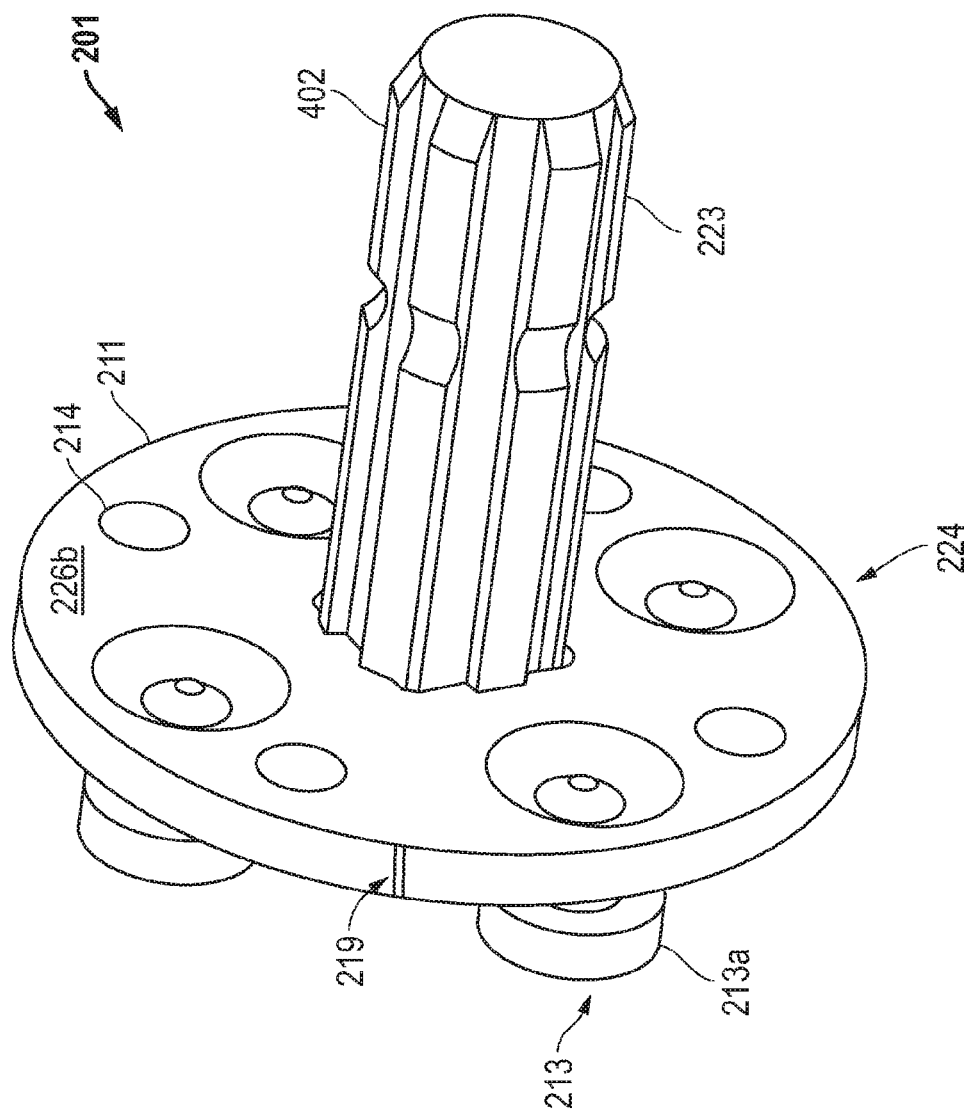
FIG. 9 is an oblique view of an alternative exemplary embodiment of a second plate of the improved PTO system of FIG. 8, wherein the second plate has an male spline which attaches to the driveshaft of a rotary implement.

FIGS. 8 and 9 are alternative exemplary embodiments of a first plate 209 and a second plate 211. In the alternative exemplary embodiments depicted in FIGS. 8 and 9, the one or more locking holes 214 are defined therethrough on the second plate 211, and the locking shear pin opening 216 is defined therethrough on the first plate 209. In the exemplary embodiments of FIG. 2-5, the one or more locking holes 214 are defined on the first plate 209, and the locking shear pin opening 216 is instead defined on the second plate 211. Moreover, in the alternative exemplary embodiments of FIGS. 8 and 9, the locking shear pin 215 may have a locking shear pin head 215a without a ring 217 (as is included, by way of example, on the exemplary embodiments of FIG. 2-5). However, locking shear pin head 215a should still have a larger diameter than the locking shear pin opening 216 and each locking shear pin hole 214. Locking shear pin stem 215b may be threaded, inserted or engaged therethrough the first plate 209 to at least one locking hole 214 on the second plate 211. The alternative exemplary embodiment as described in FIG. 8-9 allows the implement or trailer 603 and/or the implement shaft or receptacle 604 to perform or operate with decreased interference with the locking shear pin 215. Connectors 213 will perform substantially similarly as described for earlier described exemplary embodiments of FIG. 2-5.

Figure 4:
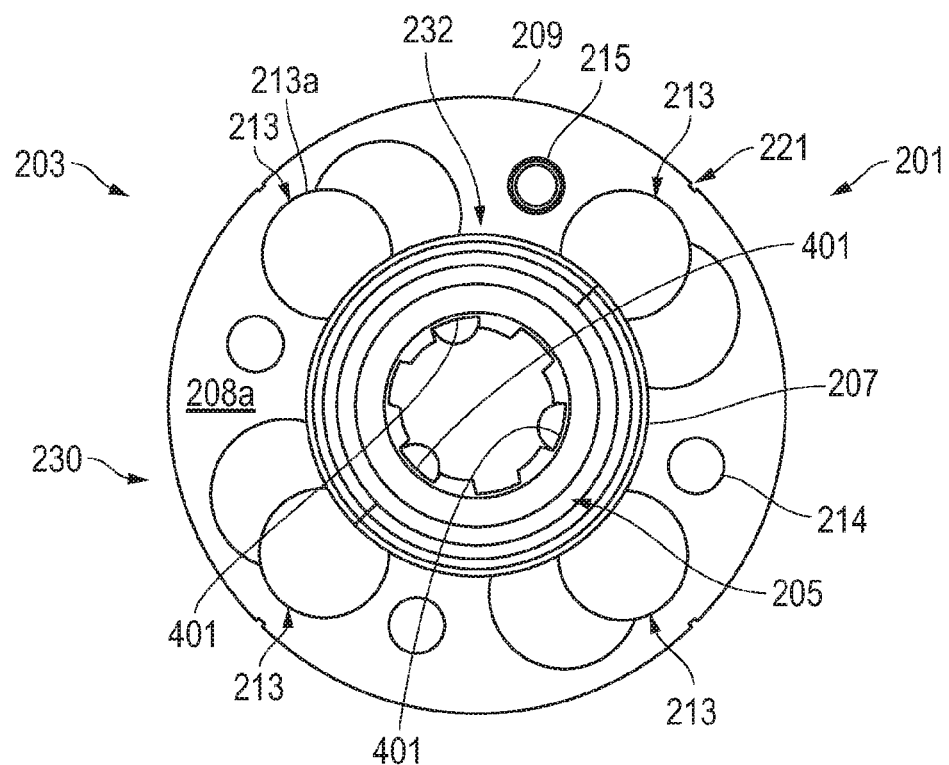
FIG. 4 is a front view of the system of FIG. 2.
Figure 5:
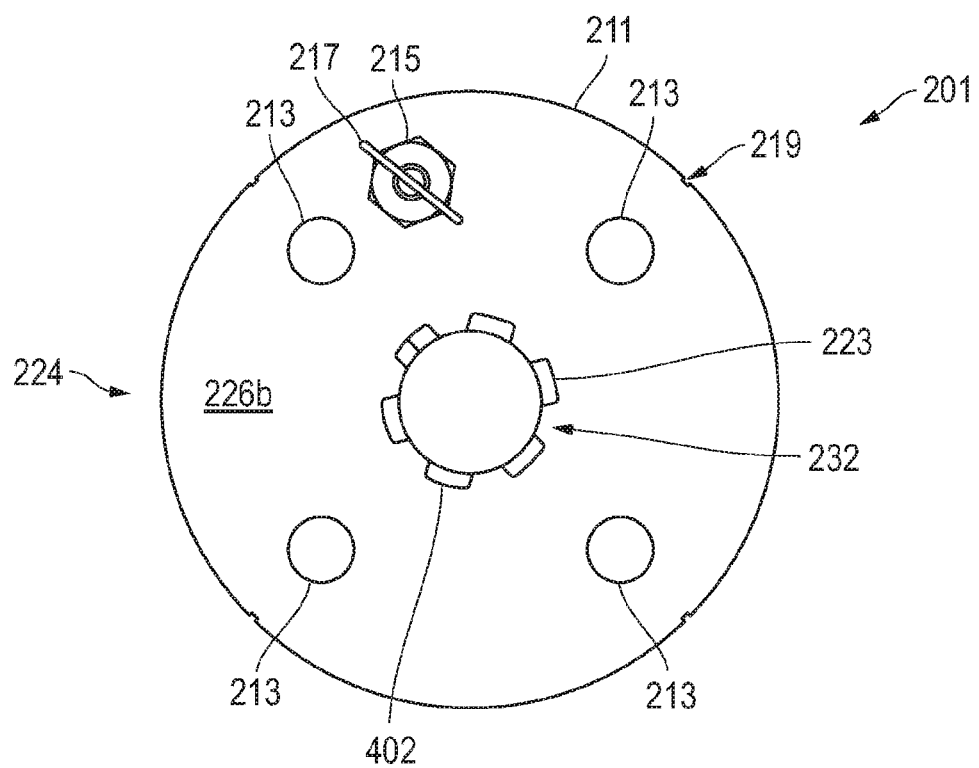
FIG. 5 is a back view of the system of FIG. 2.

As shown in FIG. 4 and FIG. 5, the connection 232 between the male spline or implement spline 223 and/or the body or female spline 207 to the respective plates 211 and 209 may be a bevel and/or chamfer at the end of the spline 223 and/or body 207 which is welded to the respective plate 211 and/or plate 209, which may also be beveled and/or chamfered. In alternative embodiments, the spline 223 and/or body 207 may be threaded to the respective plate 211 and/or 209. In further alternative exemplary embodiments, the spline 223 and/or body 207 may be machined as a unitary piece with their respective plate 211 and/or 209. Other connections of the spline 223 and/or body 207 to the respective plates 209 and/or 211 as known to one of ordinary skill in the art are considered within the present disclosure. Furthermore, as disclosed herein, the connectors 213 (including bolts, pins, clevis pins, magnets or extensions 213) and/or locking shear pin 215 may also optionally be threaded to, welded to, or machined as a unitary piece with the plate 211. Optionally, the end of the connector shaft 213b which is connected to the plate 211 may also be beveled at the tip/end of said shaft 213b. If using welding to produce the parts of the system 201, the beveling at the shaft 213b, implement spline 223, body 207 and/or plates 209,211 may help to achieve a full penetration weld or a more solid weld when connecting to the respective plates 209 and/or 211. By way of example only, and not limited to, the implement spline 223 and/or body or receiver 207 may be constructed of an AISI 1045 type of carbon steel or similar material; whereas the studs or connectors 213, plate 209 and plate 211 may be constructed of an ASTM A36 or ASTM 1018 carbon steel or similar material.

Figure 14:
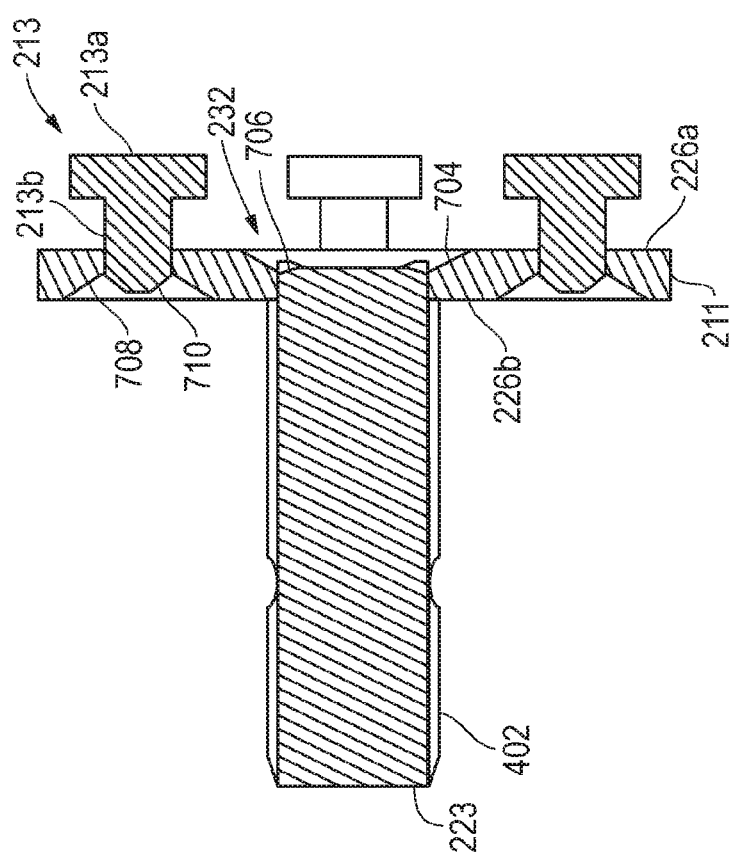
FIG. 14 is a cross-sectional view of the alternative exemplary embodiment along line 14-14 as shown in FIG. 13.
Figure 13:
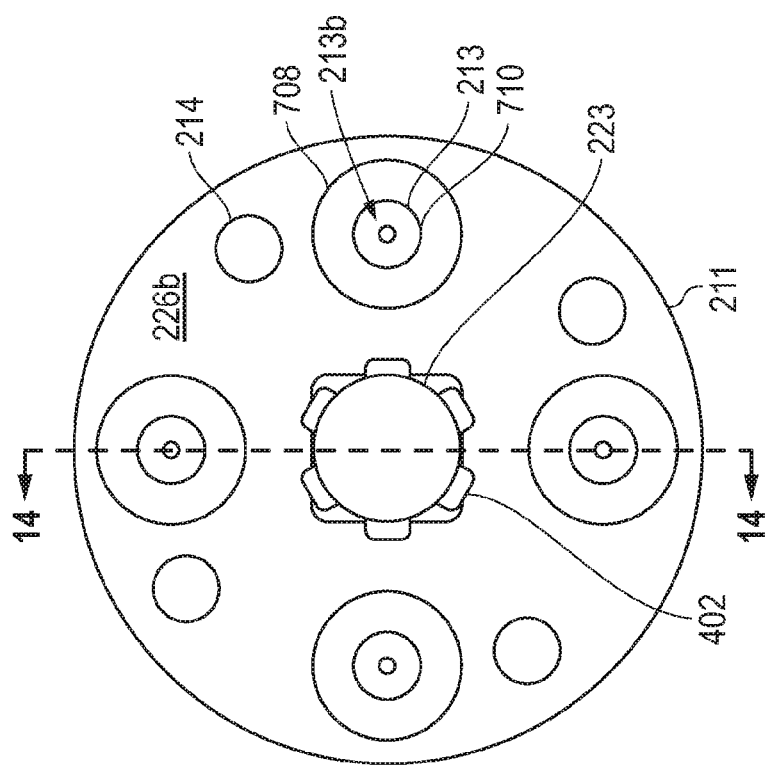
FIG. 13 is an end view of the alternative exemplary embodiment of FIG. 9.

Referring now to FIG. 10-12, an end view of the first or female plate 209 is depicted in FIG. 10 along with cross-sectional views of FIG. 10 in FIG. 11-12, showing the bevels and chamfers as described above in additional detail. The first plate 209 on the surface 208b defines a center bevel or chamfer 700, located substantially towards the center of the plate 209, for joining or attaching at connection 232 to the body or receiver 207. Additionally, the body or receiver 207 may also define a receiver end bevel or chamfer 702 adjacent and at an angle to the center bevel 700 of the plate 209. Welding or connecting at the bevels 700, 702 may help to achieve a full penetration weld or a more solid weld when connecting, assembling or attaching the body 207 to the plate 209. Referring to FIG. 13-14, an end view of the second or male plate 211 is depicted in FIG. 13, along with a cross-sectional view of FIG. 13 along line 14-14 in FIG. 14, which shows the bevels and chamfers as described above in additional detail. The second or male plate 211 may have a center or spline bevel or chamfer 704 substantially towards the center of the plate 211, as defined on the surface 226a. An end of the implement spline 223 may also define a bevel or chamfer 706 towards the surface 226a of the plate 211, adjacent and at an angle to the center bevel 704 of the plate 211. Welding or connecting at the bevels 704, 706 may help to achieve a full penetration weld or a more solid weld when connecting, assembling or attaching the implement spline 223 to the plate 211. Furthermore, the plate 211 may define one or more connector bevels or chamfers 708 on the outer surface 226b. The connectors 213 may also define a connector end bevel or chamfer 710 at the end of the connector stem 213b. Furthermore, when assembled, the connector end bevel 710 may be adjacent and at an angle to the one or more plate connector bevels or chamfers 708. If not machining the connectors 213 as a unitary piece with the plate 211, the connectors 213 may be inserted or attached to plate 211 with the assistance of bevels or chamfers 708, 710, wherein welding or connecting the bevels 708, 710 may help to achieve a full penetration weld or a more solid weld when attaching, assembling, or connecting the connectors 213 to the plate 211.

Figure 6:
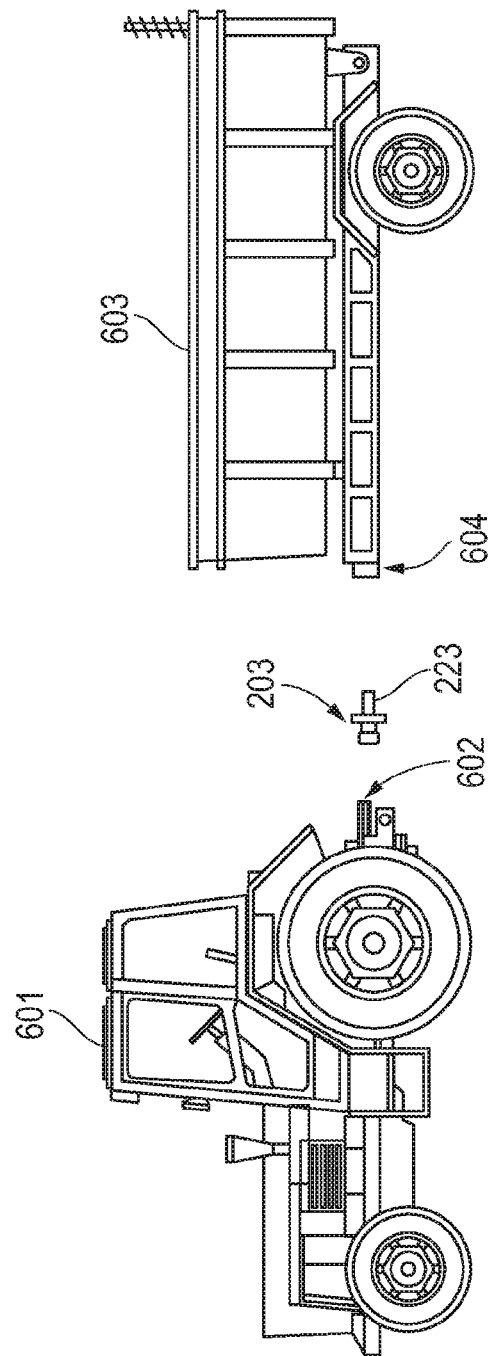
FIG. 6 is a side view of the system of FIG. 2.

Extending from plate 211 is an implement spline 223 configured to engage with the implement shaft or implement receptacle 604. Implement spline 223 may have six or more teeth 402. Extending from and secured to the first plate 209 is a housing 203 having a body or receiver 207; within the body or receiver 207 is an opening 205 with a plurality of grooves 401 configured to removably interlock or engage with the tractor 601 PTO shaft 602, as shown in FIG. 6. Tractor 601 PTO shaft 602 may be splined in certain exemplary embodiments, and the grooves 401 of the opening 205 of the receiver 207 may be complementary to the splines or shape of the PTO shaft 602. In one contemplated method of use, the housing 203 remains secured to the PTO shaft 602 of the tractor 601, while the plate 211 remains secured to the tractor implement, implement or trailer 603, and wherein the two plates are secured to each other prior to use of the implement, tractor implement or trailer 603. By way of example only, the implement 603 may be a power-driven implement.

In FIG. 6, a side view of the tractor 601 is shown utilizing the system discussed above, wherein the housing 203 is configured to engage with the complementary PTO shaft or extension 602 of the tractor 601 and the implement spline 223 is configured to engage with a complementary implement shaft, extension or receptacle 604 of an implement or trailer 603. By way of example only and not to be limited to, the PTO shaft or extension 602 as attached or connected to tractor 601 may have six (6) or twenty-one (21) teeth in a spline; accordingly, the body or receiver 207 would have a corresponding number of grooves 401 to complement and/or engage the appropriate PTO shaft 602. Likewise, by way of example only and not limited to, the implement spline 223 may also be a six (6) or twenty-one (21) tooth 402 spline. The complementary implement receptacle 604 would also have a corresponding number of grooves (not illustrated) or shape to complementarily accommodate and engage the implement spline 223. In a further alternative exemplary embodiment as illustrated in FIG. 7, the implement spline 223 on second plate 211 may instead be connected to the tractor 601 via a corresponding or complementary connector on the tractor 601; additionally, in the alternative exemplary embodiment as shown in FIG. 7, the housing 203 on the first plate 209 may be connected to the implement or trailer 603 via a corresponding or complementary extension on the implement or trailer 603.

An exemplary embodiment of a method of use for the subject disclosed embodiment as illustrated in the figures follows. To connect or engage plates 209, 211, the plurality of connectors 213 are inserted into the larger open end 210a of the plurality of tapered openings 210. Subsequently, the first plate 209 and the second plate 211 are twisted or rotated in relation to each other in a first direction; and the plurality of connectors 213 are slid, moved or maneuvered from the larger open end 201a of the plurality of tapered openings 210 to the smaller open end 210b of the plurality of tapered openings 210. The connector top 213a, being of a larger size than the smaller open end 210b of the plurality of openings 210, prohibits the removal of the plurality of connectors 213 from the smaller open end 210b of the plurality of tapered openings 210. Additionally, at least a first guideline 221 as inscribed on the circumference 228a of the first plate 209 is aligned with a second guideline 219 inscribed on the circumference 228b of the second plate 219. The locking shear pin stem 215b can now be threaded, engaged or inserted through the locking shear pin slot 216 and one or more of the locking shear pin holes 214. The plates 209 and 211 are now prevented or prohibited from rotation in relation to each other. The receiver or body 207 of the first plate 209 may be already be engaged with the PTO shaft 602 prior to the plates 209, 211 connecting as described above, or may be engaged with the PTO shaft 602 after the plates 209,211 have been connected. Likewise, the implement spline 223 as extending from the fourth outer surface 226b of the second plate 211 may also already be removably engaged with the implement receptacle 604 prior to the connection of the plates 209,211, or the implement spline 223 and the implement receptacle 604 may be engaged after the connection of plates 209,211 as described herein.

To disengage, disconnect, separate or remove the plates 209 and 211 from each other, first the locking shear pin stem 215b is unthreaded, disengaged or removed from the at least one locking shear pin hole 214 from which the stem 215b was engaged and also from the locking shear pin opening or slot 216 from which the locking shear pin stem 215b was also engaged. Now the first plate 209 and the second plate 211 can be twisted or rotated in relation to each other in a second direction (opposite to the first or initial direction). Subsequently, the plurality of connectors 213 are slid, moved or maneuvered from the smaller open end 210b of the plurality of tapered openings 210 to the larger open end 210a of the plurality of tapered openings 210. Then, the plurality of connectors 213 can be removed or disengaged from the larger open end 210a of the plurality of tapered openings 210 and the plates 209 and 211 are fully disengaged.

In certain exemplary embodiments having a locking spring loaded pull or shear pin 215, the locking spring loaded shear pin 215 may be initially inserted into, or engaged with the locking shear pin slot 216 prior to engaging the connector or stud 213 to the plurality of tapered openings 210. The spring of the spring loaded housing 215c and locking pin stem 215b are depressed or retreated into the locking shear pin slot 216 (on the respective plate 209 or 211 containing said locking shear pin slot 216) when the connector 213 is engaged with the larger open end 210a of the plurality of tapered openings 210. When the connector 213 rotates into the smaller end of the opening 210b, the locking shear pin slot 216 may align with the one or more locking shear pin holes 214. The spring of the spring loaded housing 215c may be biased to engage the locking pin stem 215b with the one or more locking shear pin holes 214. When the locking shear pin slot 216 and the one or more locking shear pin holes 214 align, the spring of the spring loaded housing 215c may automatically engage, plunge, insert or activate the locking pin stem 215b into the one or more locking shear pin holes 214, thus preventing further rotating, twisting or turning of the plates 209, 211 relative to each other.

The particular exemplary embodiments disclosed above are illustrative only, as the exemplary embodiments may be modified and practiced in different but equivalent manners apparent to those skilled in the art having the benefit of the teachings herein. It is therefore evident that the particular exemplary embodiments disclosed above may be altered or modified, and all such variations are considered within the scope and spirit of the application. Accordingly, the protection sought herein is as set forth in the description. Although the present exemplary embodiments are shown above, they are not limited to just these exemplary embodiments, but are amenable to various changes and modifications without departing from the spirit thereof.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A quick-release device for a tractor PTO shaft, comprising:
    a first plate having:
        a first body having a first outer surface and a second outer surface and a first thickness disposed therebetween;
        a plurality of openings extending through the first thickness of the first body, wherein each of the plurality of openings define a larger open end and a smaller open end on both of the first outer surface and the second outer surface;
at least one locking hole extending through the first thickness of the first body;
a second plate, having:
a second body having a third outer surface and a fourth outer surface and a second thickness disposed therebetween; and
a plurality of connectors extending from the third outer surface of the second body, the plurality of connectors are configured to removably engage with the plurality of openings;
a locking pin configured to secure the first plate and the second plate via the at least one locking hole;
a housing secured to the first plate and configured to engage with the tractor PTO shaft; and
an implement spline extending from the fourth outer surface of the second plate, the implement spline is configured to removably engage with an implement.

2. The quick-release device of claim 1, further wherein the plurality of connectors are configured to removably engage with the larger open end of the plurality of openings.

3. The quick-release device of claim 2, wherein the plurality of connectors define a connector top, wherein the connector top is of a larger size than the smaller open end of each of the plurality of openings.

4. The quick-release device of claim 3, further comprising a first circumference defined around the first plate and a second circumference defined around the second plate; and further comprising a first guideline on the first circumference and a second guideline on the second circumference.

5. The quick-release device of claim 4, wherein the first guideline and the second guideline are aligned when the plurality of connectors engage the smaller open end of the plurality of openings.

6. The quick-release device of claim 5, wherein the plurality of connectors comprise a plurality of clevis pins.

7. A method for quick-release and connection for a PTO shaft, comprising the steps:
providing a first plate having a first thickness between a first outer surface and a second outer surface, wherein the first plate defines a plurality of tapered openings, wherein each tapered opening defines a larger open end and a smaller open end on both the first and second outer surface, wherein the first plate further defines at least one locking hole;
providing a second plate having a second thickness between a third outer surface and a fourth outer surface, and wherein the second plate further defines a locking pin slot;
extending a plurality of connectors from the third outer surface, wherein each connector has a connector top and a connector stem, and further wherein each connector top is insertable and removable from the larger open end of the plurality of tapered openings, and wherein each connector top is prohibited from insertion and removal from the smaller open end of the plurality of tapered openings; and
providing a locking pin having a locking pin head and a locking pin stem, wherein the locking pin stem is insertable and removable from the at least one locking pin hole and the locking pin slot; and wherein the locking pin head is prohibited from insertion and removal from the at least one locking pin hole and the locking pin slot.

8. The method according to claim 7, further comprising the steps of inserting the plurality of connectors into the larger open end of the plurality of tapered openings.

9. The method according to claim 8, further comprising the steps of
rotating the first plate and the second plate in relation to each other in a first direction; and
sliding the plurality of connectors from the larger open end of the plurality of tapered openings to the smaller open end of the plurality of tapered openings.

10. The method according to claim 9, further comprising the step of aligning a first guideline inscribed on the circumference of the first plate with a second guideline inscribed on the circumference of the second plate.

11. The method according to claim 10, further comprising the step of prohibiting the removal of the plurality of connectors from the smaller open end of the plurality of tapered openings.

12. The method according to claim 11, further comprising the steps of inserting the locking pin stem through the locking pin slot and inserting the locking pin stem through the at least one locking pin hole.

13. The method according to claim 12, further comprising the step of preventing rotation of the first plate in relation to the second plate.

14. The method according to claim 13, further comprising the steps of providing a receiver attached to the first plate; and engaging the receiver to the PTO shaft.

15. The method according to claim 14, further comprising the steps of extending an implement spline from the fourth outer surface; and engaging an implement receptacle attached to a trailer.

16. The method according to claim 15, further comprising the steps of:
removing the locking pin stem from the at least one locking pin hole;
removing the locking pin stem from the locking pin slot;
rotating the first plate and second plate in relation to each other in a second direction, wherein the second direction is opposite to the first direction;
sliding the plurality of connectors from the smaller open end of the plurality of tapered openings to the larger open end of the plurality of tapered openings; and
removing the plurality of connectors from the plurality of tapered openings.

* * * * *